United States Patent
Gupta

(10) Patent No.: US 10,694,022 B1
(45) Date of Patent: Jun. 23, 2020

(54) AUTONOMOUS PROFILE SWITCHER FOR DEVICES BASED UPON EXTERNAL ENVIRONMENT

(71) Applicant: Dell Products L. P., Round Rock, TX (US)

(72) Inventor: Shubham Gupta, Jaipur (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/243,605

(22) Filed: Jan. 9, 2019

(51) Int. Cl.
*H04M 1/725* (2006.01)

(52) U.S. Cl.
CPC ... *H04M 1/72566* (2013.01); *H04M 1/72569* (2013.01); *H04M 1/72572* (2013.01); *H04M 1/72577* (2013.01)

(58) Field of Classification Search
CPC ......... H04M 1/72566; H04M 1/72572; H04M 1/72577; H04M 1/72569
See application file for complete search history.

(56) References Cited

U.S. PATENT DOCUMENTS

| | | | |
|---|---|---|---|
| 6,701,144 B2 | 3/2004 | Kirbas et al. | |
| 6,975,874 B1 | 12/2005 | Bates et al. | |
| 7,162,237 B1 | 1/2007 | Silver et al. | |
| 7,835,730 B2 * | 11/2010 | Boss | H04M 1/72577 379/207.16 |
| 9,143,898 B1 * | 9/2015 | Barr | H04W 4/025 |
| 2002/0077144 A1 * | 6/2002 | Keller | H04W 4/029 455/550.1 |
| 2004/0235464 A1 | 11/2004 | Korkalo et al. | |
| 2005/0181808 A1 | 8/2005 | Vaudreuil | |
| 2006/0041663 A1 | 2/2006 | Brown et al. | |
| 2006/0154674 A1 | 7/2006 | Landschaft et al. | |
| 2009/0186633 A1 | 7/2009 | Yonker et al. | |
| 2009/0262078 A1 * | 10/2009 | Pizzi | G06F 1/1626 345/169 |
| 2009/0298511 A1 * | 12/2009 | Paulson | H04M 1/72572 455/456.1 |
| 2011/0117902 A1 | 5/2011 | Chang et al. | |
| 2011/0241827 A1 | 10/2011 | Varoglu | |
| 2013/0331067 A1 * | 12/2013 | Coussemaeker | H04M 1/72569 455/412.2 |
| 2014/0278044 A1 * | 9/2014 | Jacobs | H04W 4/40 701/300 |

(Continued)

*Primary Examiner* — Brandon J Miller
(74) *Attorney, Agent, or Firm* — Campbell Stephenson LLP; Shiv S. Naimpally

(57) ABSTRACT

In some examples, a computing device may receive sensor data from a plurality of sensors and determine a location of the computing device in three-dimensions. A calendar application executing on the computing device may be accessed to determine that a first event is currently scheduled. A setting may indicate that a ringer of the computing device is unmuted to enable the ringer to be heard when the computing device receives an incoming communication (e.g., a call, a text, or a message). If the sensor data, the first event, or both satisfy a particular rule of a set of decision rules, the computing device may automatically modify the setting to mute the ringer based on the particular rule. If a user of the computing device modifies the setting to unmute the ringer, the computing device may send modification data associated with the modification to a server.

20 Claims, 8 Drawing Sheets

(56) References Cited

U.S. PATENT DOCUMENTS

2015/0207916 A1* 7/2015 Xue .................. H04W 4/12
                                                    455/412.2
2016/0282156 A1* 9/2016 Ott .................. G01D 18/00

* cited by examiner

US 10,694,022 B1

AUTONOMOUS PROFILE SWITCHER FOR DEVICES BASED UPON EXTERNAL ENVIRONMENT

BACKGROUND OF THE INVENTION

Field of the Invention

This invention relates generally to computing devices that are capable of originating and receiving communications (e.g., calls and messages), such as smartphones, smartwatches, and the like, and more particularly to determining whether a ring tone is played when an incoming call or message is received.

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A computing device that is capable of originating and receiving telephone calls and messages (e.g., text messages and/or emails), such as a smartphone, a smartwatch, and the like, may have settings associated with a ringer to enable a user to hear or mute the ringer when an incoming call is received. For example, when the user desires to be undisturbed by an incoming call or message (e.g., when the user is in an important meeting), the user may mute the ringer to prevent the ringer from being heard. When the user desires to be notified of an incoming call or message (e.g., when the user is expecting an important call), the user may unmute the ringer to enable the ringer to be heard. However, the user may sometimes forget to mute the ringer, causing the ringer to be heard at an inopportune time and/or the user may sometimes forget to unmute the ringer, causing the user to miss an important incoming call or message. Thus, manually turning a ringer on and off is prone to human error.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may receive sensor data from a plurality of sensors and determine a location of the computing device in three-dimensions. In some cases, a calendar application executing on the computing device may be accessed to determine that a first event is currently scheduled. A setting may indicate that a ringer of the computing device is unmuted to enable the ringer to be heard when the computing device receives an incoming communication (e.g., a call, a text, or a message). If the sensor data, the first event, or both satisfy a particular rule of a set of decision rules, the computing device may automatically modify the setting to mute the ringer based on the particular rule. If the computing device determines that a modification has been made (e.g., by a user of the computing device) to the setting to unmute the ringer, the computing device may send modification data associated with the modification to a server. The computing device may receive from the server, one of: (i) a new set of decision rules selected by the server based at least in part on the modification data, or (ii) a modified set of decision rules. For example, the server may modify the set of decision rules based at least in part on the modification data to create the modified set of decision rules. The computing device may receive second sensor data from the plurality of sensors and determine, based on the second sensor data, a second location of the computing device that is different from the first location. The computing device may determine that a second event is currently scheduled, determine that the ringer is muted, determine that the second sensor data, the second event, or both satisfy a second particular rule of the set of decision rules, and modify the setting to unmute the ringer based on the second particular rule. The computing device may receive third sensor data from the plurality of sensors and determine, based on the third sensor data, a third location of the computing device that is different from the first location (and from the second location). The computing device may determine that a third event is currently scheduled, determining that the ringer is muted, determine that the third sensor data or the third event fail to satisfy any of the rules of the set of decision rules, and not modify the setting of the ringer.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
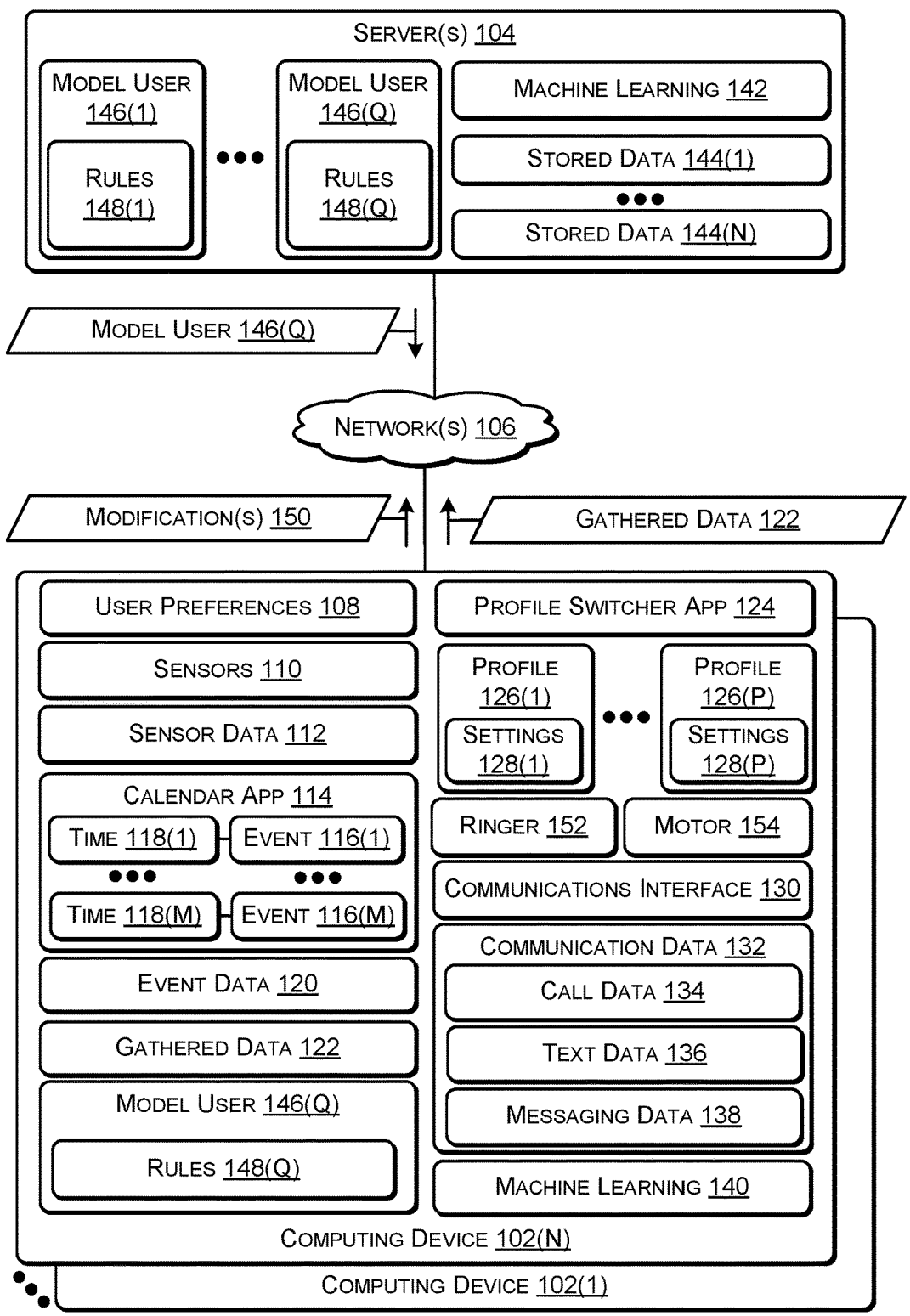
FIG. 1 is a block diagram of a system that includes multiple computing devices, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein use machine learning models to create decision rules that can be used to automatically switch from a first profile (e.g., settings) of a computing device, such as a smartphone or smartwatch, to a second profile. For example, the first profile may enable the ringer while the second profile may disable the ringer (e.g., preventing the ringer from being heard). Of course, each of the profiles may have additional settings, such as enabling (or disabling) a vibrate mode, enabling (or disabling) Wi-Fi® communications, enabling (or disabling) cellular communications, enabling (or disabling) near field communications (NFC) (e.g., Bluetooth®, Zigbee®, or the like), do not disturb (DND) settings, battery saver settings, media volume settings, call volume settings, speakerphone or earpiece setting, ringer volume setting, alarm volume setting, notification settings, mobile data settings, preset reply (e.g., without user intervention) settings, settings identifying which ringer and associated volume is associated with each sender of a communication, and the like. Depending on the environment, a profile having the appropriate settings may be selected.

Initially, in a data gathering phase, an application (e.g., software application) may be installed on multiple devices (e.g., smartphones, smartwatches, or the like). Each device of the multiple devices may be associated with a beta user. In the data gathering phase, the application gathers: (1) environmental data, (2) event data, (3) communications data, and (4) settings data. The gathered data is sent to a server for further analysis. Environmental data refers to sensor data received from various sensors included in the device, such as a location of the device in three dimensions (e.g., latitude, longitude, and altitude). For example, the environmental data may include a global positioning system (GPS) position (provided by a GPS sensor), a magnetic position (provided by a magnetometer), a Wi-Fi® based position (provided by a Wi-Fi® positioning system (WPS)), an angle of arrival (provided by a communications interface that includes a cellular interface capable of determining a direction of propagation of a radio-frequency wave), a received signal strength indicator (RSSI) (provided by a communications interface capable of measuring the power present in a received cellular signal), an ambient light measurement (e.g., provided by an imaging component, such as a camera, of the device), an ambient noise measurement (e.g., provided by a transducer, such as a microphone, of the device), a temperature measurement (e.g., provided by a thermometer of the device), an altitude measurement (e.g., provided by a barometer of the device), a temperature measurement (e.g., provided by a thermometer of the device), visual positioning data (e.g., provided by a visual positioning system (VPS) of the device), another type of sensor data, or any combination thereof. The event data may include events scheduled in an electronic calendar. The communications data may include data associated with communications that are received by a user of the device and communications that are originated by the user of the device. The beta user may provide information, such as their profession, to the server. The data may be gathered and sent to the server over a predetermined period of time (e.g., N days (N>0), such as one week, two weeks, or the like.

In addition to gathering environmental data from the sensors of the device, the application may gather settings data associated with settings of the device, such as, for example, when the user changes one or more of the settings. For example, the settings data may identify whether the ringer is enabled or disabled, whether vibrate mode is enabled or disabled, whether Wi-Fi® communications are enabled or disabled, whether cellular communications are enabled or disabled, whether NFC is enabled or disabled, whether another setting is enabled or disabled, or any combination thereof. To illustrate, a user may modify the settings when the user enters (or prior to entering) a location where the user desires to not hear (e.g., be disturbed by) the ringer and may modify (or reset) the settings when the user exits (or after exiting) a location where the user desires to hear the ringer. For example, locations where the user desires to not hear the ringer may include a meeting room, an entertainment venue (e.g., movie theater, concert hall, or the like), a place of worship (e.g., church, temple, mosque, or the like), a museum, a library, a yoga studio, and the like.

The server may receive the gathered data from each of the multiple devices at predetermined time intervals (e.g., every N hours, N>0) or if the amount of gathered data satisfies a threshold (e.g., to prevent the device memory from becoming full). After the data gathering phase is complete, the server may analyze the gathered data in a data analysis phase.

In the data analysis phase, the gathered data may be analyzed to create multiple model users (e.g., generic user profiles). For example, users with similar characteristics may be used to create each model user. Thus, each model user may have a particular set of characteristics, such as, for example, a particular profession (e.g., marketing, software engineer, or the like), particular work timings (e.g., works 9 AM to 5 PM, works long hours, works weekends, and the like), particular locations other than home and work that the user frequents (e.g., a bar or a restaurant, a theater, a music venue, and the like), and other characteristics. The model users may be used to identify decision rules for determining when to switch from a first profile (with a first set of settings)

to a second profile (with a second set of settings) and from the second profile back to the first profile (or to a third profile with a third set of settings). For example, users with similar characteristics may make the same (or similar) decisions when switching from one profile to another profile. Thus, users with similar characteristics may be used to create multiple model users.

Decision tree-based machine learning, a form of predictive modelling, may be used to create, based on the user models, decision rules regarding when to switch from one profile to another profile. For example, each user model may have a corresponding set of decision rules that identify environmental conditions under which a device automatically switches from one profile to another profile. Decision tree machine learning uses a decision tree (e.g., a type of predictive model) to use sensor data (represented in the branches of the tree) to determine which profile to select. The decision tree thus visually represents decisions and decision making.

A Random Forest machine learning model may be used to verify a correctness of the decision rules of each model. Random Forest machine learning uses multiple decision trees that are merged to get more accurate and stable predictions. For example, each beta tester may be provided with a model user (and corresponding decision rules) that matches the characteristics of each beta tester. The Random Forest machine learning model may reside (i) on each device, (ii) on the server, or (iii) a portion of the machine learning model may reside on the device while a remaining portion may reside on the server). The application may use the model user and corresponding decision rules to determine when to switch from one profile (e.g., ringer can be heard) to another profile (e.g., ringer cannot be heard). If the user determines that the selected profile is unsuitable and modifies the settings (e.g., unmutes a muted ringer or mutes an unmuted ringer), then the application may make a note of the modification to the settings and send data regarding the modification to the server. The Random Forest machine learning model may use this information to verify a correctness of the decision rules and modify the decision rules accordingly. For example, if a particular decision rule indicates to mute the ringer when a particular set of sensor data is received and the user unmutes the ringer after the rule is applied, then the particular decision rule may be modified to unmute the ringer. As another example, if a particular decision rule indicates to unmute the ringer when a particular set of sensor data is received and the user mutes the ringer after the rule is applied, then the particular decision rule may be modified to mute the ringer. In this way, the Random Forest machine learning model may be used to verify and adjust the initial decision rules to create a final set of decision rules.

After the final decision rules have been created, the application may be deployed, in a deployment phase, to multiple devices of multiple users (e.g., non-beta users). An application that is installed on a particular device of the multiple devices may gather data for a particular time period (e.g., M days where M>0) and send the gathered data to the server. The server may compare the characteristics of the user that is using the particular device with the characteristics of each of the multiple model users and identify a particular model user that closely resembles the user. Look-alike modelling (or similar) may be used to predict how a model user will switch a profile (including ringer settings, vibrate settings, Wi-Fi® settings, and the like) based on the behavior of the beta testers. For example, for situations that the beta testers did not encounter, look-alike modelling may be used to predict what the model user will do in those situations. The server may send the particular model user and corresponding decision rules to the application. The application may use the decision rules, along with sensor data, to determine when to automatically (e.g., without human interaction) switch from one profile to another profile. In some cases, more than one model user may be similar to the user. In such cases, multi-objective programming modeling may be used to identify one model user from among multiple model users that are similar to the user.

As an example, a computing device may include one or more processors and one or more non-transitory computer readable media storing instructions that are executable by the one or more processors to perform various operations. For example, the operations may include receiving sensor data from a plurality of sensors and determining, based on the sensor data, a location of the computing device in three-dimensions. For example, the three-dimensions may include an approximate latitude, an approximate longitude, and an approximate altitude associated with the computing device. The latitude and the longitude may be determined using at least one of: (i) a global positioning system (GPS) sensor, (ii) a communications interface including a wireless-based positioning system, or (iii) a visual positioning system that uses image data from an imaging sensor and map data from a mapping application. The altitude may be determined using a barometer that determines a barometric pressure of an area surrounding the computing device to determine the altitude. The operations may include accessing a calendar application executing on the computing device and determining that a first event is currently scheduled. The operations may include determining that a setting of the computing device indicate that a ringer of the computing device is unmuted to enable the ringer of the computing device to be heard when the computing device receives an incoming communication (e.g., a call, a text, or a message). The operations may include determining that at least the sensor data or the first event satisfies a particular rule of a set of decision rules and modifying the setting to mute the ringer based on the particular rule. The operations may include determining that a modification has been made (e.g., by a user of the computing device) to the ringer setting to unmute the ringer and sending modification data associated with the modification to a server. The operations may include receiving from the server, one of: (i) a new set of decision rules selected by the server based at least in part on the modification data, or (ii) a modified set of decision rules. For example, the server may modify the set of decision rules based at least in part on the modification data to create the modified set of decision rules. The operations may include receiving second sensor data from the plurality of sensors and determining, based on the second sensor data, a second location of the computing device that is different from the first location. The operations may include determining that a second event is currently scheduled, determining that the ringer is muted, determining that at least the second sensor data or the second event satisfies a second particular rule of the set of decision rules, and modifying the ringer setting to unmute the ringer based on the second particular rule. The operations may include receiving third sensor data from the plurality of sensors, determining, based on the third sensor data, a third location of the computing device that is different from the first location (and the second location), determining that a third event is currently scheduled, determining that the ringer is muted, determining that the third sensor data and the third event fail to satisfy each rule of the set of decision rules, and not modifying the ringer setting of the ringer.

FIG. 1 is a block diagram of a system 100 that includes multiple computing devices, according to some embodiments. In the system 100, computing devices 102(1) to 102(N) (N>0) are connected to one or more servers 104 via one or more networks 106.

Each of the computing devices 102, such as the representative computing device 102(N), may include user preferences 108, sensors 110, sensor data 112 (e.g., generated by the sensors 110), and various applications including a calendar application ("app") 114. The calendar application may include multiple events 116, with each of the events 116 having a corresponding time interval 118 (e.g., a start time and a stop time for an event). The computing device 102 may include event data 120 that is gathered from the calendar app 114 and gathered data 122 that is gathered from various components of the computing device 102, as described herein. The computing device 102 may include a profile switcher app 124 that selects from one of profiles 126(1) to 126(P) (P>1). Each of the profiles 126 may have a corresponding set of settings 128. For example, the settings 128 may identify a setting of a ringer 152, a setting of a motor 154 or similar mechanism that causes the computing device 102(N) to vibrate when an incoming communication is received, which originators of a communication (e.g., call, text, message, or the like) are blocked, which originators of a communication are not blocked enabling (or disabling) enabling (or disabling) Wi-Fi® communications, enabling (or disabling) cellular communications, enabling (or disabling) near field communications (NFC), such as Bluetooth®, Zigbee®, do not disturb (DND) settings, battery saver settings, media volume settings, call volume settings, speakerphone or earpiece setting, ringer volume setting, alarm volume setting, notification settings, mobile data settings, preset reply (e.g., without user intervention) settings, settings identifying which ringer and associated volume is associated with each sender of a communication, and the like. Depending on the environment, a profile having the appropriate settings may be selected.

The computing device 102 may include a communications interface 130 that enables various type of communications to be sent and received. For example, the communications interface 130 may be capable of communications using Wi-Fi®, cellular (e.g., code division multiple access (CDMA) or global system for mobile (GSM), near field communications (NFC) (e.g., Bluetooth®, ZigBee, or the like), another type of communication technology, or any combination thereof. Communication data 132 may be gathered by monitoring the communications interface 130. For example, the communication data 130 may include call data 134, text data 136, and messaging data 138. The call data 134 may identify whether the call was an audio call or a video call (e.g., Skype®, FaceTime®, or similar), an originator of each call, when the call occurred, how long the call lasted, and other call-related data. The text data 136 may identify an originator of a text message, a length of the text message, and the like. The messaging data 136 may identify an originator of a message, a length of the message, and the like. The message may be an email or another type of message, such as Facebook® Messenger, WhatsApp®, or the like. The originator of a communication may be a user of the computing device 102(N) (e.g., the user of the computing device 102(N) originates a communication that is received by another user) or another user (e.g., a second user originates a communication that is received by the user of the computing device 102(N)).

The computing device 102 may include a machine learning 140 (e.g., a software application implementing a machine learning algorithm) to analyze the gathered data 122. In some cases, the machine learning 140 may work in conjunction with a machine learning 142 (e.g., a software application implementing a machine learning algorithm) that executes on the server 104. For example, the machine learning 140 may perform some processing of the gathered data 122 and the machine learning 142 may perform a remainder of the processing.

In a data gathering phase, the profile switcher app 124 may be installed on at least some of the computing devices 102, e.g., devices that are being used by beta users. In the data gathering phase, the profile switcher app 124 may gather: (1) environmental data (e.g., the sensor data 112), (2) the event data 120, (3) the communications data 132, (4) the settings data 128. The data may be gathered and sent to the server over a predetermined period of time (e.g., N days (N>0), such as one week, two weeks, or the like. Environmental data refers to the sensor data 112 received from various sensors 110 of the device, such as a location of the device in three dimensions (e.g., latitude, longitude, and altitude) and other information related to a current environment of the computing device 102(N). The event data 120 may include the events 116 scheduled and the communication data 132. The communications data 132 may include data associated with communications (e.g., calls, texts, messages) sent from and received by the computing device 102(N), including when the communication was sent or received, a length of the communication, the sender and the receiver of the communication, and the like. The settings data 128 may include information about whether the ringer 152 is set to on (e.g., ringer is heard) or off (e.g., ringer is not heard), whether the motor 154 is set to cause the computing device 102(N) to vibrate when an incoming communication is detected, which originators of communications are blocked, other settings, or any combination thereof.

The machine learning 140 may correlate the sensor data 112, the event data 120, the communications data 132, and the settings data 128 to determine various relationships. The machine learning 140 may create a model to predict future user behavior based on the relationships. For example, the gathered data 122 may indicate that, before entering a particular meeting room to attend a particular meeting, a user may select a profile 126 having a particular set of settings 128. To illustrate, the user may attend a meeting once a week at the same time and location. The meeting may be organized by someone senior to the user, such as a vice president of a company. The user may select the settings 128(P) in which the ringer 152 is muted. The gathered data 122 may indicate that the user, who is a manager of a team, exchanges messages during the meeting with one or more team leaders in his team asking them for a status of a project that each team leader is managing. Based on this information, the machine learning 140 may predict that when someone senior to the user (e.g., based on a hierarchical chart of an organization) organizes a meeting, the user may select one of the profiles 126 that mutes the ringer prior to the meeting start time. As another illustration, the user may routinely skip a meeting that the calendar app 114 shows as a recurring meeting that is organized by a peer of the user or a direct report of the user. During the time that meeting is scheduled, the user may select the settings 128(1) in which the ringer 152 is unmuted to enable the user hear the ringer 152 and be notified of incoming communications. Based on this information, the machine learning 140 may predict that when someone at the same level or lower to the user (e.g., based on a hierarchical chart of the organization) organizes a meeting, the user may select one of the profiles 126 that unmutes the ringer because the user is predicted to skip the meeting. Of course, each profile may have other settings besides the ringer 152 that may be modified when a particular one of the profiles 126 is selected.

In addition to gathering environmental data from the sensors 110 of the computing device 102(N), the profile switcher app 124 may gather the settings 128 associated with profiles of the computing device 102(N). For example, when the user changes one of the settings 128 at a particular time, the profile switcher app 124 may determine and store the sensor data 112, the event data 120, and the communications data 132 within a predetermined number of milliseconds after the user has changed the settings 128. Each of the settings 128 may identify whether the ringer is enabled or disabled, whether vibrate mode is enabled or disabled, whether Wi-Fi® communications are enabled or disabled, whether cellular communications are enabled or disabled, whether NFC is enabled or disabled, whether another setting is enabled or disabled, or any combination thereof. To illustrate, a user may modify the settings when the user enters (or prior to entering) a location where the user desires to not hear (e.g., be disturbed by) the ringer and may modify (or reset) the settings when the user exits (or after exiting) a location where the user desires to hear the ringer. For example, the user may desire to not hear the ringer prior to entering: a meeting room, an entertainment venue (e.g., movie theater, concert hall, or the like), a place of worship (e.g., church, temple, mosque, or the like), a museum, a library, a yoga studio, or other situations in which the user does not wish to be disturbed. The user may desire to hear the ringer when: the user skips a meeting, the user is expecting to receive an important communication, at home, or after the user has exited: a meeting room, an entertainment venue, a place of worship (e.g., church, temple, mosque, or the like), a museum, a library, a yoga studio, or the like.

The computing device 102 may send the gathered data 122 to the server 104 for analysis (e.g., to create model users and decision rules). The gathered data 122 may be sent at a predetermined time interval (e.g., every X hours), when a size of the gathered data 122 satisfies a predetermined threshold (e.g., Y gigabytes (GB)), when another condition is satisfied, or any combination thereof.

The server 104 may receive the gathered data 122 from multiple devices of the computing devices 102 and store the gathered data 122 as the stored data 144. For example, the stored data 144(1) may include data gathered and sent by the computing device 102(1) and the stored data 144(N) may include the gathered data 122 sent by the computing device 102(1).

In a data analysis phase, the server 104 may analyze the gathered data 144 to create multiple model users (e.g., generic user profiles) 146(1) to 146(Q) (Q>0). For example, based on analyzing the stored data 144, users with similar characteristics may be used to create a particular one of the model users 146. Each of the model users 148 may have a particular set of common characteristics, such as, for example, a particular profession (e.g., marketing, software engineer, or the like), particular work timings (e.g., 9 AM to 5 PM, 10 AM to 7 PM, works weekends, and the like), particular locations other than home and work that the user frequents (e.g., a bar or a restaurant, a theater, a music venue, and the like), and other characteristics. The model users 146 may be used to determine decision rules 148(1) to 148(Q) that identify situations in which to switch from a first profile of the profiles 126 to a second profile of the profiles 126 and from the second first back to the first profile (or to a third profile of the profiles 126). For example, users with similar characteristics may make the same (or similar) decisions when switching from one of the profiles 126 to another of the profiles 126.

The machine learning 142 may use decision tree-based machine learning, a form of predictive modelling, to create, based on the model users 146, the corresponding decision rules 148. The rules 148 may identify when to switch from one of the profiles 126 to another of the profiles 126. For example, the rules 148 may identify particular conditions (e.g., based on the sensor data 112, the event data 120, and the communications data 132) that identify when to switch from one of the profiles 126 to another of the profiles 126.

The machine learning 142 may use Random Forest machine learning to verify a correctness of the rules 148 associated with each of the model users 146. The Random Forest machine learning model may reside (i) on each of the computing devices 102, (ii) on the server 104, or (iii) a portion of the machine learning model may reside on each of the computing devices 102 while a remaining portion may reside on the server 104. The profile switcher app 124 may use a model user, e.g., the model user 146(Q), and corresponding rules 148(Q) to determine when to switch from one of the profiles 126 (e.g., in which ringer 152 can be heard) to another of the profiles 126 (e.g., in which the ringer 152 is muted). If the user determines that the particular profile of the profiles 126 (e.g., selected by the profile switcher app 124) is unsuitable and modifies the corresponding one of the settings 128 (e.g., unmutes a muted ringer or mutes an unmuted ringer), then the profile switcher app 124 may make a note of the modification(s) 150 to the settings 128 and send information associated with the modification 150 to the server 104. The machine learning model 142 may use the modifications 150 to modify the correspond rules (e.g., the rules 148(Q)) accordingly. For example, assume a particular one of the rules 148(Q) indicates to mute the ringer 152 when a particular set of conditions occur (e.g., as determined based on the sensor data 112, the event data 120, and the communications data 132). If the user unmutes the ringer 152 after the particular rule is applied, then the particular rule of the rules 148(Q) may be modified to unmute the ringer 152 when the particular set of conditions occur. As another example, assume a particular one of the rules 148(Q) indicates to unmute the ringer 152 when a particular set of conditions occur (e.g., as determined based on the sensor data 112, the event data 120, and the communications data 132). If the user mutes the ringer 152 after the particular rule is applied, then the particular rule of the rules 148(Q) may be modified to mute the ringer 152 when the particular set of conditions occur. In this way, the Random Forest machine learning model may be used to verify and modify the rules 148. In some cases, the server 104 may create a generic model user in the model users 146 that incorporates the most common traits of users. The generic model user may have a set of corresponding generic rules 148 to decide when to switch profiles.

After the decision rules 148 have been finalized, the profile switcher app 124 may be deployed, in a deployment phase, to additional ones of the computing devices 102, e.g., associated with non-beta users. In some cases, the profile switcher app 124 that is installed on the computing device 102(N) in the deployment phase may be provided with a generic model user of the model users 146. In other cases, the user may be asked to answer a brief survey, e.g., "Are you single or living with a partner?", "How many children do you have?", "What is your profession?" and the like, and based on the answers, the server 104 may identify user characteristics, select a particular model user of the model users 146 that is a closest match, and deploy the profile switcher app 124 to the user's computing device with the particular model user. The profile switcher app 124 may gather data and periodically (e.g., at a predetermined time interval) send the gathered data 122 to the server 104. The server 104 may use the gathered data 122 to determine user characteristics and compare the characteristics of the user that is using the computing device 102 with the characteristics of each of the multiple model users 146 determine if a different model user of the model users 146 more closely matches the user. If a different model user is a closer match, the server 104 may provide the different model user to the computing device 102(N) to replace the model user 146(Q). In some cases, more than one of the model users 146 may be similar to the user of the computing device 102(N). In such cases, multi-objective programming modeling may be used to identify one of the model users 146 that is most similar to the user. Look-alike modelling (or a similar technique) may be used to predict the circumstances under which the model user 146(Q) that is being used by the computing device 102(N) will switch from a first of the profiles 126 to another of the profiles 126. For example, for situations that the beta testers did not encounter, look-alike modelling may be used to predict what the model user 146(Q) will do in such situations. The server 104 may send the particular model user 146(Q) and corresponding rules 148 to the computing device 102(N) for use by the profile switcher app 124. The profile switcher app 124 may determine whether the sensor data 112, the event data 120, and the communication data 132 sensor data, satisfy one of the rules 148(Q). When the sensor data 112, the event data 120, and the communications data 132, satisfy one of the rules 148(Q), the profile switcher app 124 may automatically (e.g., without human interaction) switch from one of the profiles 126 to another of the profiles 126.

Thus, an app may be installed on multiple devices associated with multiple beta users. The app may gather data, including sensor data, event data, and communication data, and data associated with settings of the device. The settings may indicate whether the beta tester has a ringer muted or unmuted, whether the beta tester has set a vibration motor to on or off, and other information related to how the beta tester has configured the settings of the device. After gathering the data for several days (e.g., one week), the app may send the gathered data to a server for analysis. The server may receive the data gathered by each device on which the app was installed. The server may analyze the data to identify users with common characteristics (e.g., similar profession, similar lifestyle, similar work habits, similar non-work habits and the like) and create model users. For example, the server may use machine learning to create a first model user for professionals who are single and employed in one of a particular set of professions, a second model user for professionals who are living with a partner without children and employed in one of another particular set of professions, a third model user for professionals who are living with a partner with children and employed in one of yet another particular set of professions, and so on. For each model, the server may create, using machine learning, decision rules predicting the behavior of the model user under circumstances that the beta users may not have encountered during the data gathering phase.

In some cases, when a production version of the app is deployed to non-beta users, the app may use a generic model user. The app may gather data about the user's behavior, such as determining when the user modifies a particular setting that was selected based on the generic model user, and send information about the modification(s) to the server. The server may, based on the modifications made by the user, and based on data gathered by the app, select a particular model user (e.g., rather than the generic model user) that more closely matches the characteristics of the user and send the model user to the app for installation on the computing device. In other cases, the server may conduct a brief survey to determine characteristics of the user, such as a profession of the user, whether the user is single or living with a partner, whether user has children, and the like. Based on the survey results, the server may select a particular model user and corresponding rules and send the particular model and rules to the device associated with the user. The app may gather data about the user's behavior, such as determining when the user modifies a particular setting that was selected based on the particular model user, and send information about the modification(s) to the server. The server may, based on the modifications made by the user, and based on data gathered by the app, modify the particular model user or select a different model user that more closely matches the characteristics of the user. The modified model user or the different model user may be sent to the app for installation on the computing device.

Figure 2:
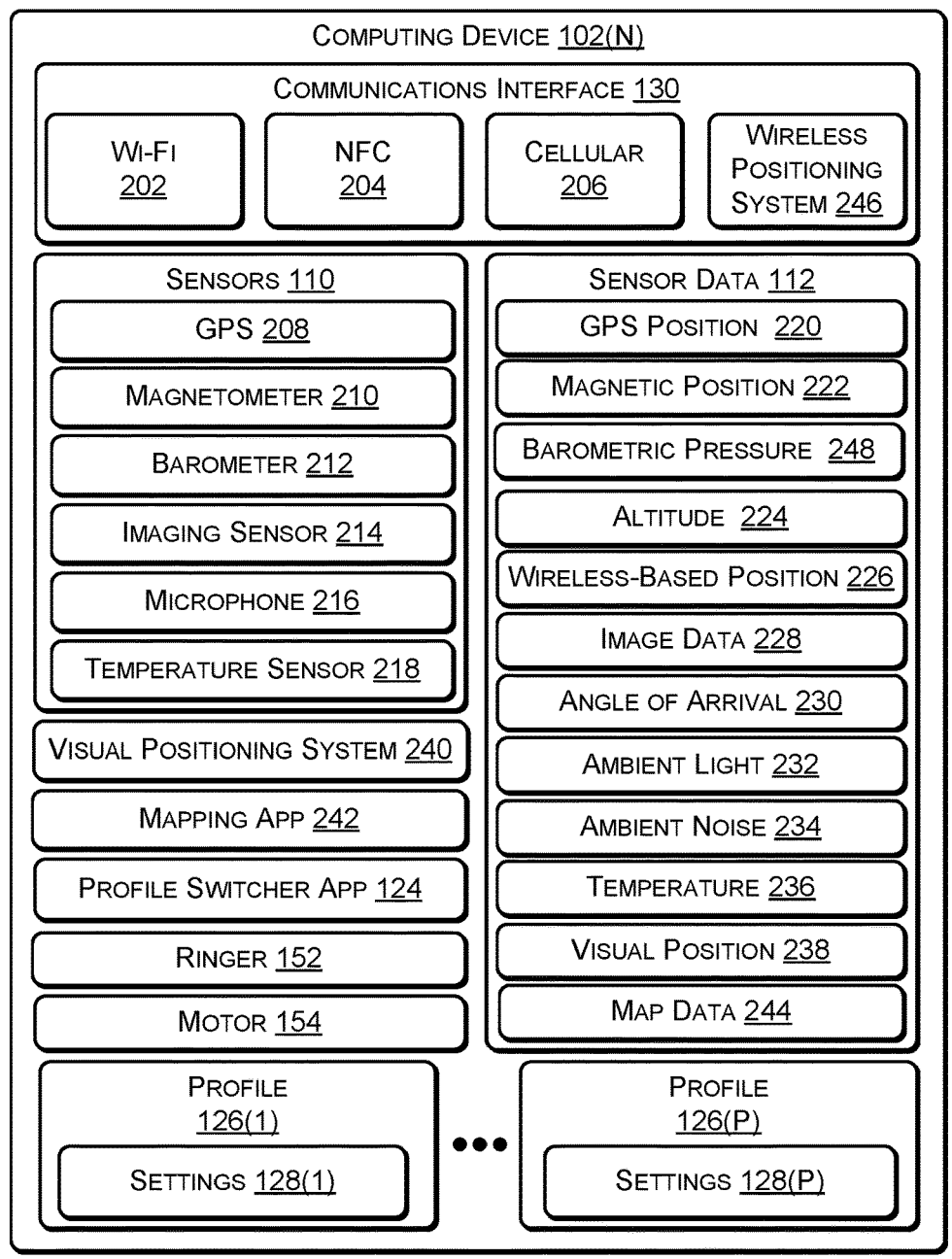
FIG. 2 is a block diagram of a system that includes sensors and sensor data, according to some embodiments.

FIG. 2 is a block diagram 200 of a system that includes sensors and sensor data, according to some embodiments. The representative computing device 102(N) may include the communications interface 130, the sensors 110, and the sensor data 112.

The communications interface 130 may include one or more interfaces to enable communications via various standards and technologies, such as, for example, a Wi-Fi® standard 202 (e.g., IEEE 802.11 compliant), a near field communication (NFC) technology 204 (e.g., such as Bluetooth®, ZigBee®, or the like), a cellular standard 206 (e.g., code division multiple access (CDMA), global system for mobile (GSM), or the like), and a wireless positioning system 246. The wireless positioning system 246 may use a Wi-Fi® signal received by the Wi-Fi® interface 202 to determine a location of the computing device 102(N) in three dimensions (e.g., latitude, longitude, and altitude). The wireless positioning system 246 may use a cellular signal received by the cellular interface 206 to determine a location of the computing device 102(N) in three dimensions (e.g., latitude, longitude, and altitude).

The sensors 110 may include a global positioning system (GPS) sensor 208, a magnetometer 210, a barometer 212, an imaging sensor 214 (e.g., camera), a microphone 216, and a temperature sensor 218. Of course, the sensors 208, 210, 212, 214, 216, 218 are purely examples and the sensors 110 may include other types of sensors in addition to (or instead of) the sensors illustrated in FIG. 2. The sensors 110 may include at least the GPS 208 and a sensor capable of providing altitude (or height) information, such the barometer 212, to enable a location of the computing device 102(N) to be determined in three dimensions. For example, for users that work in an office building with multiple floors, a first meeting room may be at a first height, a second meeting room may be at a second height, the user's workspace (e.g., desk) may be located at a third height, and so on. Thus, the sensors 110 include sufficient types of sensors to provide three-dimensional data to enable a position of the user to be accurately determined in three dimensions. In this way, the profile switcher app 124 can select (e.g., switch to) one of the profiles 126 when the user moves from a first work location (e.g., first meeting room), to a second work location (e.g., second meeting room or user workspace), and so on.

The sensor data 112 may include a GPS position 220, a magnetic position 222, barometric pressure 248, altitude data 224, a wireless-based position, image data 228, an angle of arrival 230, ambient light data 232, ambient noise data 234, temperature data 236, visual positioning data 238, and map data 244. Of course, the sensor data 112 may include other types of sensor data based on the variety of types of sensors included in the sensors 110.

The GPS sensor 208 may provide the GPS position 220 that includes two-dimensional positioning information (e.g., latitude and longitude or the like). The magnetometer 210 may measure the earth's magnetic field, enabling the magnetometer 210 to be used as a compass to determine an absolute orientation in a North East West South (NESW) plane.

The barometer 212 may provide the barometric pressure 248 to determine the altitude data 224. The altitude data 224 may enable a position of the computing device 102(N) and the associated user to be determined in three-dimensional space, thereby enabling a position of the computing device 102(N) and the associated user to be tracked at a location, such as work, that has multiple heights (e.g., floors).

The wireless positioning system 246 may provide the wireless-based position information 226. For example, the wireless positioning system 246 may use a Wi-Fi® positioning system (WPS). WPS is a geolocation system that uses the characteristics of nearby Wi-Fi hotspots and other wireless access points to determine a location of the computing device 102(N). In some cases, WPS may be used to supplement the GPS position 112 and the altitude data 224 to more precisely determine a location of the computing device 102(N). For example, an intensity of a received signal strength indicator (RSSI) may be measured relative to nearby wireless access points to geolocate the computing device 102(N). Parameters used to geolocate a particular wireless access point may include a service set identifier (SSID) and media access control (MAC) address. The accuracy of the geolocation depends on the number of nearby wireless access points whose positions have been entered into a database. A Wi-Fi hotspot database may be populated by correlating GPS location data with Wi-Fi hotspot MAC addresses.

The wireless positioning system 246 may provide the angle of arrival data 230. The angle of arrival data 230 may determine a direction of propagation of a radio-frequency wave incident on a cellular antenna array or based on a maximum signal strength during antenna rotation. The angle of arrival data 230 may be determined based on measuring a time difference of arrival of individual elements of the cellular antenna array.

The imaging sensor 214 (e.g., camera sensor) may provide the ambient light 232. The microphone 216 (or other type of transducer) may provide the ambient noise 234. For example, in a room (e.g., a theater or a hall) where a movie is to be played back, where musicians are to perform music, where actors are to perform a play, and the like, prior to the performance, the lighting is typically dimmed and the audience becomes quiet. The dimming of the lighting may result in a significant (e.g., more than a threshold amount of) reduction in the ambient light 232. The dimming of the lighting may also result in a significant (e.g., more than a threshold amount of) reduction in the ambient noise 234 as the audience prepares for the performance. Thus, when the profile switcher app 124 detects a significant (e.g., more than a threshold amount of) reduction in the ambient light 232, the ambient noise 234, or both, the profile switcher app 124 may predict that the user is at a location where a movie is to be played, musicians or actors are to perform, or the like, resulting in the profile switcher app 124 switching from a currently selected one of the profiles 126 (e.g., a profile in which the ringer 152 is unmuted and can be heard) to another of the profiles 126 (e.g., a profile in which the ringer 152 is muted and cannot be heard). The profile switcher app 124 may confirm the prediction (e.g., that the computing device 102(N) is located in a place where a performance is to take place) based on geolocation data provided by, for example, the GPS position 220, the magnetic position 222, the altitude 224, the wireless-based position 226, the image data 228, the angle of arrival 230, or any combination thereof. When the profile switcher app 124 detects a significant (e.g., more than a threshold amount of) increase in the ambient light 232, the ambient noise 234, or both, the profile switcher app 124 may predict that the user has moved from a location where a performance (e.g., movie playback, actors performing a play, musicians performing music, or the like) occurred to a noisier environment (e.g., outside the performance venue or a restaurant, bar, or the like), resulting in the profile switcher app 124 switching from a currently selected one of the profiles 126 (e.g., a profile in which the ringer 152 is muted and cannot be heard) to another of the profiles 126 (e.g., a profile in which the ringer 152 is unmuted and can be heard). The profile switcher app 124 may confirm the prediction (e.g., that the computing device 102(N) is no longer located in a performance venue) based on geolocation data provided by, for example, the GPS position 220, the magnetic position 222, the altitude 224, the wireless-based position 226, the image data 228, the angle of arrival 230, or any combination thereof.

The temperature sensor 218 may provide the temperature 236. Based on a current season of a current location of the computing device 102(N), the temperature data 236 may be used to determine whether the user is indoors or outdoors. For example, in Chicago in the summer, moving from outside to inside a building may cause the profile switcher app 124 to detect a significant drop (e.g., decrease) in the temperature 236, and thereby predict that the computing device 102(N) is inside a building. Moving from inside the building to the outside may cause the profile switcher app 124 to detect a significant increase in the temperature 236, and thereby predict that the computing device 102(N) has transitioned from being inside a building to being outside. The GPS position 220 (or other sensor data 112) may be used to confirm the prediction. As another example, in Chicago in the winter, moving from outside to inside a building may cause the profile switcher app 124 to detect a significant increase in the temperature 236, and thereby predict that the computing device 102(N) is inside a building. The GPS position 220 (or other sensor data 112) may be used to confirm the prediction. Moving from inside the building to the outside may cause the profile switcher app 124 to detect a significant decrease in the temperature 236, and thereby predict that the computing device 102(N) has transitioned from being inside a building to being outside.

The image data 228 (provided by the imaging sensor 214) may be combined with the GPS position 220 (provided by the GPS 208) and map data 244 (provided by a mapping app 242) to provide the visual position 238. For example, the GPS position 220 may be used to retrieve the map data 244 (e.g., from Google® Maps) of an area in which the computing device 102(N) is currently located. The image data 228 may be correlated with the map data 244 to determine the visual position 238, e.g., to determine a location of the computing device 102(N).

Figure 3:
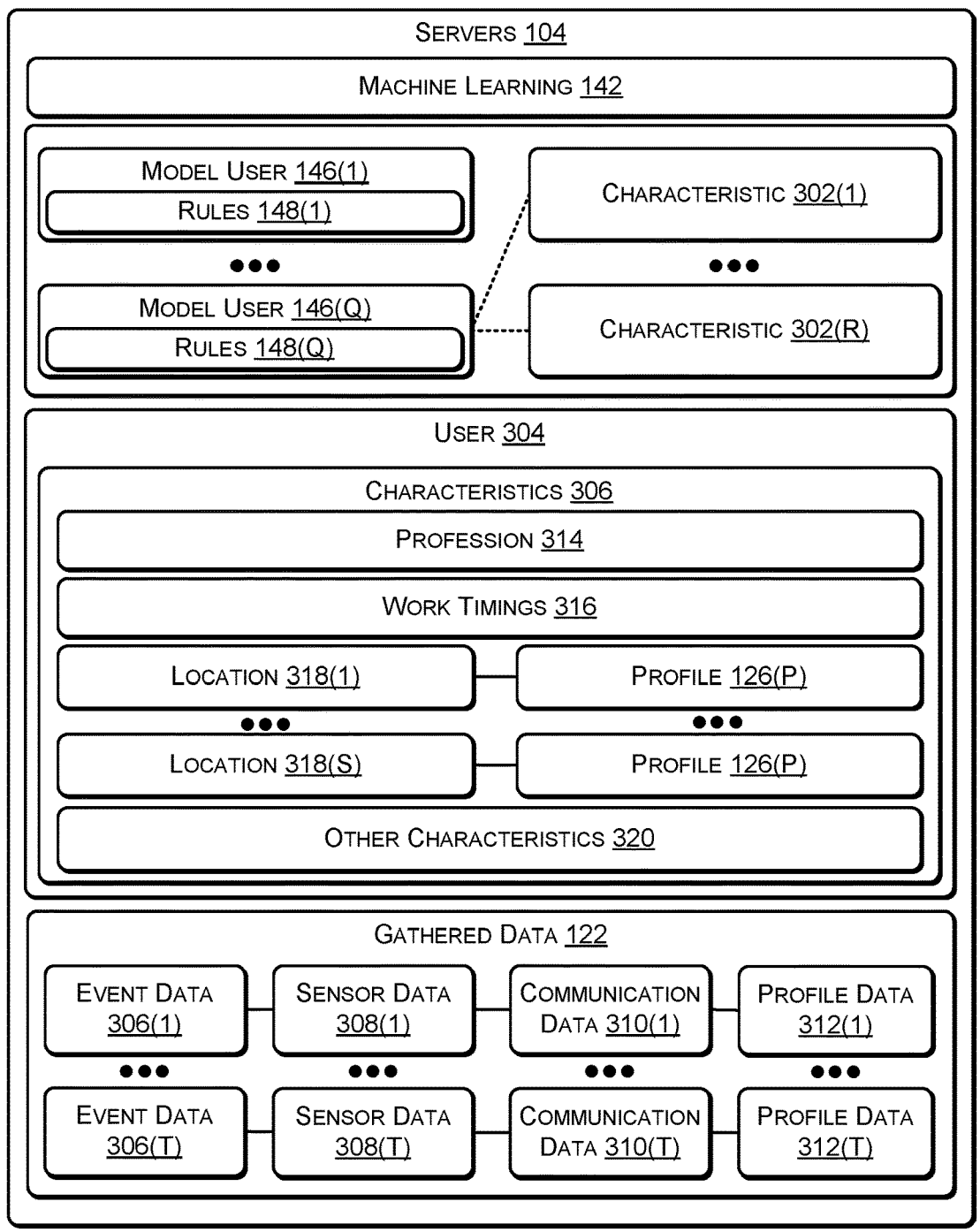
FIG. 3 is a block diagram of a system that includes multiple model users, according to some embodiments.

FIG. 3 is a block diagram 300 of a system that includes multiple model users, according to some embodiments. Each of the model users 146 may be created based on identifying common characteristics among the data gathered from the beta testers. For example, the representative model user 146(Q) may have associated characteristics 302(1) to 302(R) (R>0).

As discussed in FIG. 1, the profile switcher app 124 may gather data and periodically of a computing device 102 associated with a user 304 and send the gathered data 122 to the server 104. The gathered data 122 may include data associated with multiple events, such as event data 306(1) to 306(T) (T>0). Each of the event data 306 may have associated sensor data 308, communication data 310, and profile data 312. For example, the event data 306(T) may indicate that a particular event occurred (e.g., the user was in a meeting) from a particular start time to a particular end time on a particular date, the sensor data 308(T) may identify a particular location of the user during the event, the communication data 310(T) may indicate whether the user sent and/or received any communications (e.g., calls, texts, or messages) during the event, and the profile data 312(T) may indicate which of the profiles 126 was used during the event (e.g., whether the ringer 152 was muted or unmuted, whether the motor 154 was set to vibrate, and the like).

The server 104 may analyze the gathered data 122 to determine characteristics 306 of the user 304, such as, for example, a profession 308, work timings 310, frequently visited locations 318(1) to 318(S) and an associated one of the profiles 126, and other characteristics 320 (e.g., what the user 304 does for entertainment, and the like). The server 304 may compare the characteristics 306 of the user 304 with the characteristics 302 of each of the model users 146 to identify a closest matching model user 136 and provide the closest matching model user 136 to one of the computing devices 102 associated with the user 304.

Figure 4:
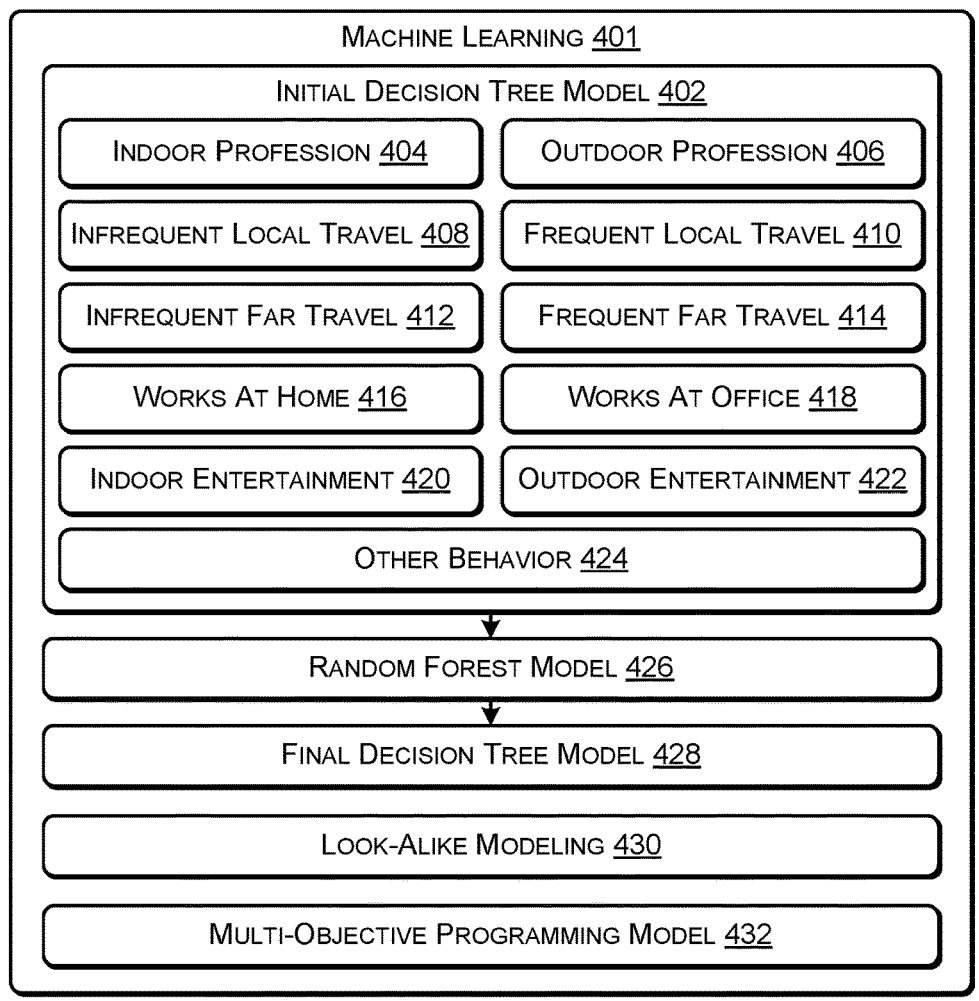
FIG. 4 is a block diagram of a system that includes a machine learning, according to some embodiments.

FIG. 4 is a block diagram 400 of a system that includes a machine learning, according to some embodiments. A machine learning 401 may use one or more machine learning techniques. The machine learning 1401, the machine learning 142, or both may use at least portions of the machine learning 401. An initial decision tree model 402 may be made based on characteristics such as whether the user has an indoor profession 404 or an outdoor profession 406, whether the user engages in infrequent local travel 408 or frequent local travel 410 (e.g., does the user drive frequently within a local area), whether the user engages in infrequent far travel 408 or frequent far travel 414 (e.g., does the user travel two or more hours to go from one area to another area), whether the user works at home 416 or works at the office 418, whether the user engages in indoor entertainment 420 or outdoor entertainment 422, and other behavior 424.

The machine learning 142 may use a Random Forest model 426 to verify a correctness of the decision rules of the initial decision tree model 402. The Random Forest model 426 uses multiple decision trees that are merged to get more accurate and stable predictions. For example, each user may be provided with one of the model users 146 (and corresponding decision rules 148) of FIG. 1 that matches the characteristics of the user. The profile switcher app 124 may use the model user 146 and corresponding decision rules 148 to determine when to switch from one of the profiles 126 (e.g., ringer unmuted) to another profile (e.g., ringer muted).

If the user determines that a decision that the profile switcher app 124 makes is unsuitable and the user modifies the settings (e.g., unmutes a muted ringer or mutes an unmuted ringer), then the profile switcher app 124 may send modification data 150 to the server 104. The Random Forest model 426 may use this information to verify a correctness of the initial decision tree model 402 and modify the initial decision tree model 402 accordingly. For example, if a particular decision rule indicates to mute the ringer when a particular set of sensor data is received and the user unmutes the ringer after the rule is applied, then the particular decision rule in the initial decision tree model 402 may be modified to unmute the ringer. As another example, if a particular decision rule indicates to unmute the ringer when a particular set of sensor data is received and the user mutes the ringer after the rule is applied, then the particular decision rule in the initial decision tree model 402 may be modified to mute the ringer. In this way, the Random Forest model 426 may verify and adjust the initial decision tree model 402 to create a final decision tree model 428.

After the final decision tree model 428 has been created, look-alike modelling 430 (or a similar technique) may be used to predict circumstances under which the model user 146(Q) that is being used by the computing device 102(N) will switch from a first of the profiles 126 to another of the profiles 126. For example, for situations that the beta testers did not encounter, the look-alike modeling 430 may be used to predict what the model user 146(Q) will do in such situations.

The profile switcher app 124 of FIG. 1 may be deployed from the server 104, in a deployment phase, to each of the computing devices 102. The profile switcher app 124 that is installed on a particular one of the computing devices 102 may gather data for a particular time period (e.g., M days where M>0) and send the gathered data 122 to the server 104. The server 104 may compare the characteristics of the user that is using the particular computing device with the characteristics of each of the multiple model users 146 to determine if a particular model user more closely resembles the user's characteristics. In some cases, the characteristics associated with more than one model user 146 may be similar to the user's characteristics. In such cases, a multi-objective programming model 432 may be used to identify one of the model users 146 that is most similar to the user, as described further in FIG. 5 below.

Figure 5:
FIG. 5 is a block diagram illustrating using look-alike modeling and multi-objective programming to identify similar users, according to some embodiments.

FIG. 5 is a block diagram 500 illustrating using look-alike modeling and multi-objective programming to identify similar users, according to some embodiments. The look-alike modeling 430 of FIG. 4 is used to determine (e.g., extrapolate) decision rules based on a similarity of a user to other users. For example, FIG. 5 illustrates a table identifying (i) five different users (e.g., having a User Id 502 of 1, 2, 3, 4, or 5), (ii) visits to eight different locations 504 (e.g., A, B, C, D, E, F, G, and H), and (iii) various features 506(1) to 506(R) associated with each of the locations 504. In FIG. 5, when a first user visits a particular location, the look-alike modeling 430 may identify a second user based on similar characteristics. In FIG. 5, the second user may be identified based on determining that the second user has visited one or more of the same locations as the first user. For example, when user 4, who has visited locations B and D, visits location E for the first time, user 2 may be identified as most similar to user 4 because user 2 has visited locations B and D as well as location E.

As another example, if user 1 visits location E for the first time, then the look-alike modeling 430 identifies another user that has one or more common characteristics, such as another user that has visited one or more of the same locations as user 1. In some cases, the look-alike modeling 430 may identify two users, user 2 and user 5, that have visited location E, as being similar to user 1. In this example, a contention arises as at least two users, e.g., user 2 and user 5, each have at least one characteristic that is similar to user 1. The multi-objective programming model 432 may be used to resolve such a contention. For example, as described in FIG. 3, the characteristics 306 of the user 304 may be compared to the characteristics 302 of two of the model users 146 (e.g., user 2 and user 5) to identify which of the model users 146 is a closer match.

Figure 6:
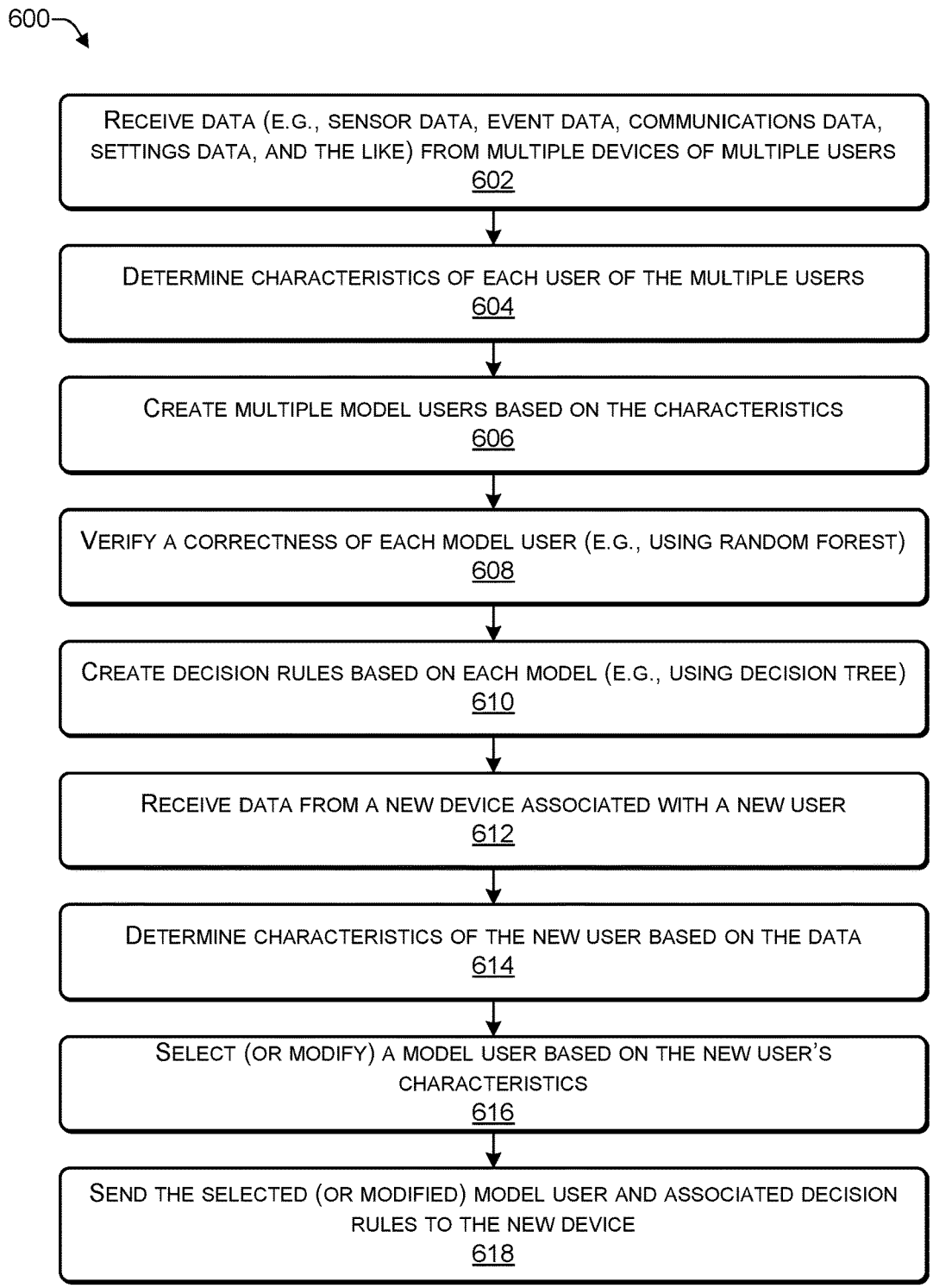
FIG. 6 is a flowchart of a process that includes creating multiple model users based on one or more characteristics, according to some embodiments.
Figure 7:
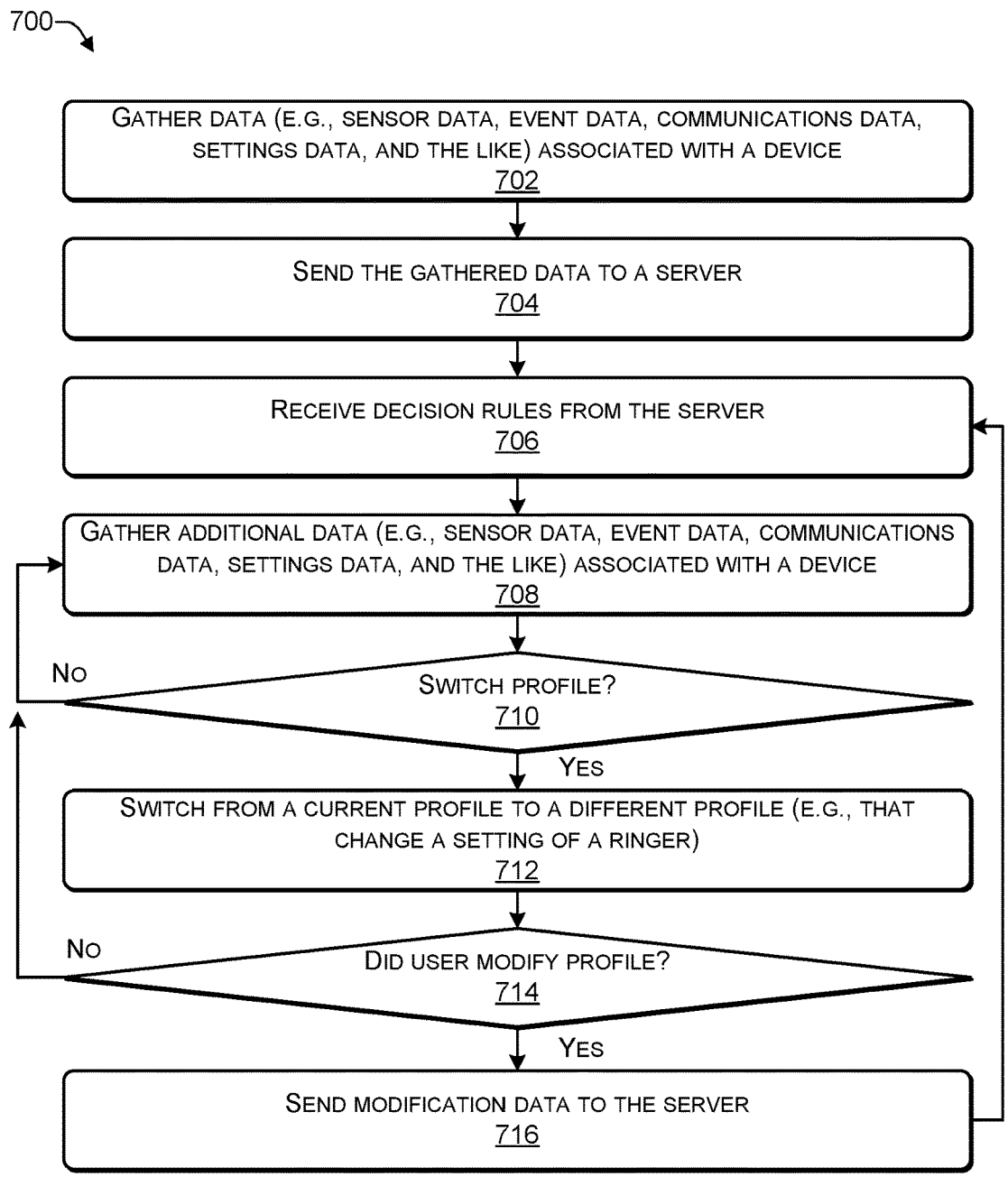
FIG. 7 is a flowchart of a process that includes switching from a current profile to a different profile, according to some embodiments.

In the flow diagram of FIGS. 6 and 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 600 and 700 are described with reference to FIGS. 1, 2, 3, 4, and 5, as described above, although other models, frameworks, systems and environments may be used to implement these processes.

FIG. 6 is a flowchart of a process 600 that includes creating multiple model users based on one or more characteristics, according to some embodiments. For example, the process 600 may be performed by the server 104 of FIGS. 1 and 3.

At 602, the server may receive data from multiple devices (e.g., sensor data, event data, communication data, settings data, and the like) from multiple devices associated with multiple users. At 604, the server may determine characteristics of each user of the multiple users. At 606, the server may create multiple model users based on the characteristics of each user of the multiple users. For example, in FIG. 1, the server 104 may receive the gathered data 122 (e.g., that includes the sensor data 112, the event data 120, the communication data 132, the settings 128, and the like) from each of the computing devices 102, such as the representative computing device 102(N). The server 104 may determine characteristics 306 associated with each user. For example, in FIG. 3, the server 104 may determine that the event data 306(T) indicates that a particular event occurred (e.g., the user was in a meeting) from a particular start time to a particular end time on a particular date, the sensor data 308(T) identifies a particular location of the computing device during the event, the communication data 310(T) indicates communications (e.g., calls, texts, or messages) that the user sent and/or received during the event, and the profile data 312(T) indicates how the settings 128 were configured during the event (e.g., whether the ringer 152 was muted or unmuted, whether the motor 154 was set to vibrate, and the like). The server 104 may create the model users 146 based on the characteristics.

At 608, the server may use a machine learning model (e.g., Random Forest or similar) to verify a correctness of each model user. At 610, the server may create (e.g., using a decision tree) decision rules based on each model user. For example, in FIG. 1, the machine learning 142 may verify a correctness of each of the model users 146 and create the corresponding rules 148.

At 612, the server may receive data from a new device associated with a new user. At 614, the server may determine characteristics of the new user based on the data. At 616, a model user may be selected (or modified) based on the new user's characteristics. At 618, the selected (or modified) model user and associated decision rules may be sent to the new device. For example, if the computing device 102(N) is using a generic one of the model users 146, then the server 104 may determine the characteristics of the user of the computing device 102(N) based on the gathered data 122, select one of the model users 146 that more closely matches the user characteristics, and send the selected model user of the model users 146 to the computing device 102(N) for the profile switcher app 124 to determine when to switch from one of the profiles 126 to another of the profiles 126. If the computing device 102(N) is using a non-generic one of the model users 146, then the server 104 may determine the characteristics of the user of the computing device 102(N) based on the gathered data 122, modify the model user that is being used, and send the modified model user to the computing device 102(N) for the profile switcher app 124 to determine when to switch from one of the profiles 126 to another of the profiles 126.

FIG. 7 is a flowchart of a process 700 that includes switching from a current profile to a different profile, according to some embodiments. The process 700 may be performed by one or more of the computing devices 102 of FIG. 1. For ease of explanation, the process 700 is described as being performed by the computing device 102(N) of FIG. 1.

At 702, the process may gather data associated with a device. At 704, the gathered data may be sent to a server. At 706, the process may receive, from the server, a model user with decision rules that the server created (e.g., based in part on correlating the gathered data with data gathered from other computing devices). For example, in FIG. 1, a software application executing on one or more of the computing devices 102 (e.g., associated with beta testers) may gather data, such as, for example, the sensor data 112, the event data 120, the settings 128, and the communication data 132 and send the gathered data 122 to the server 104. The server may use the machine learning 142 to analyze the gathered data 122 received from the computing devices 102 associated with the beta testers and create the model users 146. For example, the machine learning 142 may use the gathered data 122 received from each of the computing devices 102 to cluster users with similar (e.g., common) characteristics. The machine learning 142 may create each of the model users 146 based on each cluster of users that have similar characteristics (e.g., traits). The server 104 may identify, based on the gathered data 122, one of the model users 146 (e.g., the model user 146(Q)) that is a closest match to the computing device that sent the gathered data 122 (e.g., the computing device 102(N)) and send the corresponding one of the model users 146 to the computing device. In some cases, e.g., in a deployment phase, the server 104 may send a generic one of the model users 146 to the computing devices 102 (e.g., associated with non-beta users).

At 708, the process may gather additional data associated with a device. At 710, the process may determine whether to switch from a current profile to a different profile. If the process determines, at 710, not to switch from the current profile to the different profile, then the process may proceed back to 708 to gather additional data. If the process determines, at 710, to switch from the current profile to the different profile, then the process may proceed to 712, where the process switches from a current profile to a different profile. For example, in FIG. 1, after the profile switcher app 124 has been deployed on one or more of the computing devices 102 (e.g., associated with non-beta users), the profile switcher app 124 may gather data (e.g., the sensor data 112, the event data 120, and the communication data 132) and, based on the rule 148(Q) of the model user 146(Q), determine whether to switch from a current one of the profiles 126 to a different one of the profiles 126. If the profile switcher app 124 determines not to switch profiles, the profile switcher app 124 may continue to gather data (e.g., at 708). If the profile switcher app 124 determines to switch profiles, then the profile switcher app 124 may switch from a current one of the profiles 126 to a different one of the profiles 126. For example, the profile switcher app 124 may determine, based on the sensor data 112 and/or the event data 120, that the user has entered a place of worship or a theater, and automatically switch from a current one of the profiles 126 (e.g., a profile in which the ringer 152 is unmuted) to a different one of the profiles 126 (e.g., a profile in which the ringer 152 is muted). As another example, the profile switcher app 124 may determine, based on the sensor data 112 and/or the event data 120, that the user has exited a place of worship or a theater, and automatically If switch from a current one of the profiles 126 (e.g., a profile in which the ringer 152 is muted) to a different one of the profiles 126 (e.g., a profile in which the ringer 152 is unmuted). Of course, a setting for the ringer 152 is one of the settings 128 associated with each of the profiles 126. For example, the settings 128 associated with each of the profiles 126 may include a setting to enable (or disable) a vibrate mode, enable (or disable) Wi-Fi® communications, enable (or disable) cellular communications, enable (or disable) near field communications (NFC) (e.g., Bluetooth®, Zigbee®, or the like), do not disturb (DND) settings, battery saver settings, media volume settings, call volume settings, speakerphone or earpiece setting, ringer volume setting, alarm volume setting, notification settings, mobile data settings, preset reply (e.g., without user intervention) settings, settings identifying which ringer and associated volume is associated with each sender of a communication, and the like.

At 714, the process may determine whether the user modified the profile (e.g., after the profile was switched). If the process determines, at 714, that the user did not modify the profile (e.g., after the process automatically switched to a different profile), then the process may proceed to 708, where the process may gather additional data. If the process determines, at 714, that the user modified the profile (e.g., after the process automatically switched to a different profile), then the process may proceed to 716. At 716, the process may send modification data to the server, and proceed to 706, where the process receives a different or modified model user from the server. For example, in FIG. 1, after the profile switcher app 124 automatically switches from the profile 126(1) (e.g., in which the ringer 152 is unmuted) to the profile 126(P) (e.g., in which the ringer 152 is muted), the profile switcher app 124 may determine that the user manually modified the settings 128(P) associated with the profile 126(P) to unmute the ringer 152. The profile switcher app 124 may send the modifications 150 to the settings 128(P) to the server 104. The machine learning 142 may store this in the stored data 144 as use the stored data 144 as training data to further refine the machine learning 142. In some cases, the machine learning 142 may determine, e.g., based on the modification 150, that a different one of the model users 146 may be more suitable and select and send the different one of the model users 146 to the computing device 102(N). In other cases, the machine learning 142 may, e.g., based on the modification 150, modify one of the model users 146 (e.g., the model user 146(Q)) and send the modified one of the model users 146 to the computing device 102(N). The computing device 102(N) may receive the modified one of the model users 146 from the server 104.

Figure 8:
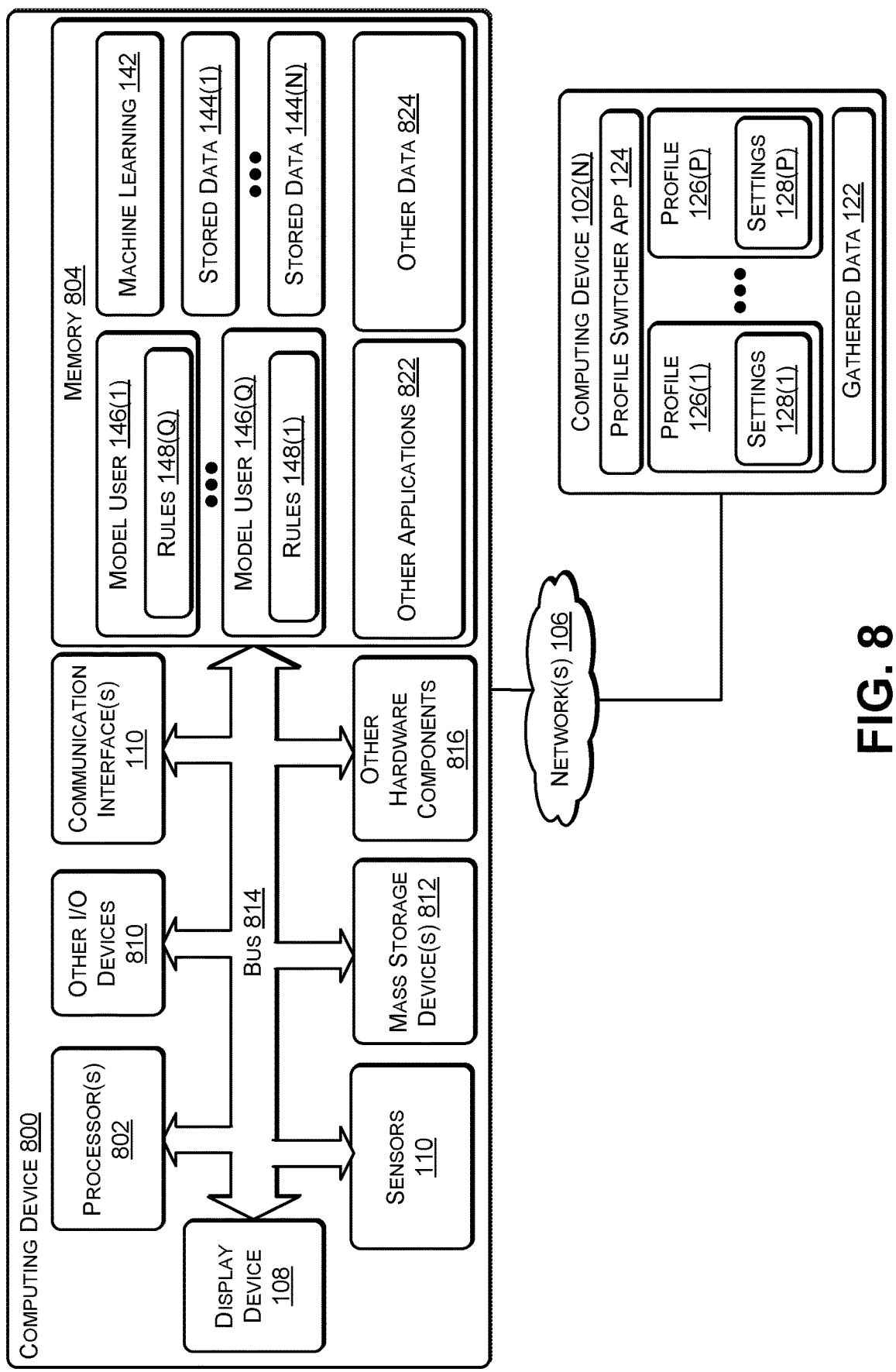
FIG. 8 illustrates an example configuration of a computing device that can be used to implement the systems and techniques described herein.

FIG. 8 illustrates an example configuration of a computing device 800 that can be used to implement the systems and techniques described herein. For example, while the computing device 800 is illustrated in FIG. 8 as implementing the server 104 of FIG. 1, the computing device 800 may also be used to determine each of the computing devices 102 of FIG. 1. The computing device 800 may include one or more processors 802 (e.g., CPU, GPU, or the like), a memory 804, communication interfaces 110, the display device 108, other input/output (I/O) devices 810 (e.g., keyboard, trackball, and the like), the sensors 110, and one or more mass storage devices 812 (e.g., disk drive, solid state disk drive, or the like), and other hardware components 816, configured to communicate with each other, such as via one or more system buses 814 or other suitable connections. While a single system bus 814 is illustrated for ease of understanding, it should be understood that the system buses 814 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 802 are one or more hardware devices that may include a single processing unit or a number of processing units, all of which may include single or multiple computing units or multiple cores. The processors 802 may include a graphics processing unit (GPU) that is integrated into the CPU or the GPU may be a separate processor device from the CPU. The processors 802 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 802 may be configured to fetch and execute computer-readable instructions stored in the memory 804, mass storage devices 812, or other computer-readable media.

Memory 804 and mass storage devices 812 are examples of computer storage media (e.g., memory storage devices) for storing instructions that can be executed by the processors 802 to perform the various functions described herein. For example, memory 804 may include both volatile memory and non-volatile memory (e.g., RAM, ROM, or the like) devices. Further, mass storage devices 812 may include hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices 812 may be collectively referred to as memory or computer storage media herein and may be any type of non-transitory media capable of storing computer-readable, processor-executable program instructions as computer program code that can be executed by the processors 802 as a particular machine configured for carrying out the operations and functions described in the implementations herein.

The computing device 800 may include one or more communication interfaces 806 for exchanging data via a network (e.g., the network 106). The communication interfaces 110 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 110 can also provide communication with external storage, such as a storage array, network attached storage, storage area network, cloud storage, or the like.

The display device 108 may be used for displaying content (e.g., information and images) to users. Other I/O devices 810 may be devices that receive various inputs from a user and provide various outputs to the user, and may include a keyboard, a touchpad, a mouse, a printer, audio input/output devices, and so forth.

The computer storage media, such as memory 116 and mass storage devices 812, may be used to store software and data. For example, the computer storage media may be used to store the model users 146, the machine learning 142, the stored data 144, other applications 822, and other data 824.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving, by one or more processors of a computing device, sensor data from a plurality of sensors;
determining, by the one or more processors and based on the sensor data, that a computing device is being used at a particular location, the computing device having a first profile associated with a first user, the first profile having a first set of decision rules including when to mute or unmute a ringer on the computing device;
determining that the particular location comprises a new location that the first user has not previously visited;
sending the particular location and the first profile to a server;
receiving, from the server, a second profile having a second set of decision rules, the second profile selected based on look-alike modelling and based on similarities between the first profile and the second profile, wherein:
the second profile is associated with a second user;
the second profile is similar to the first profile; and
the second user has visited the particular location;
updating the first profile based on the second profile and the second set of decision rules; and
switching, by the one or more processors, from the first set of settings to a second set of settings based on a particular decision rule of the second set of decision rules that are associated with the particular location.

2. The method of claim 1, wherein the particular location is determined by at least one of:
a global positioning system (GPS) sensor;
a communications interface including a wireless-based positioning system; or
a visual positioning system that uses image data from an imaging sensor and map data from a mapping application.

3. The method of claim 1, wherein the particular location is determined by:
a barometer that determines a barometric pressure of an area surrounding the computing device.

4. The method of claim 1, further comprising:
determining that a modification has been made to the second set of settings by the first user, the modification performing at least one of:
enabling or disabling a vibrate mode;
enabling or disabling wireless communications;
enabling or disabling cellular communications;
enabling or disabling near field communications;
enabling or disabling a do not disturb setting;
enabling or disabling a battery saver setting;
modifying a media volume setting;
modifying a call volume setting;
modifying a speakerphone or earpiece setting;
modifying ringer volume setting;
modifying an alarm volume setting;
modifying a notification setting;
modifying a mobile data setting;
modifying a preset reply setting; or
modifying a setting identifying a particular ringer and an associated volume associated with a particular sender of a communication; and
sending modification data associated with the modification to the server.

5. The method of claim 4, further comprising:
receiving, from the server, one of:
a new set of decision rules selected by the server based at least in part on the modification data; or a modified set of decision rules, wherein the server modifies the second set of decision rules based at least in part on the modification data to create the modified set of decision rules.

6. The method of claim 1, further comprising:
receiving second sensor data from the plurality of sensors;
determining, based on the second sensor data, a second location of the computing device that is different from the first location;
determining that the ringer is muted;
determining that the second sensor data satisfies a second particular rule of the second set of decision rules; and
switching, based on the particular rule, from the second set of settings to a third set of settings in which the ringer is unmuted.

7. The method of claim 1, further comprising:
receiving third sensor data from the plurality of sensors;
determining, based on the third sensor data, a third location of the computing device that is different from the first location;
determining that the ringer is muted;
determining that the third sensor data fails to satisfy each rule of the second set of decision rules; and
retaining the second set of settings.

8. A computing device comprising:
one or more processors; and
one or more non-transitory computer readable media storing instructions executable by the one or more processors to perform operations comprising:
receiving sensor data from a plurality of sensors;
determining, by the one or more processors and based on the sensor data, that a computing device is being used at a particular location, the computing device having a first profile associated with a first user, the first profile having a first set of decision rules including when to mute or unmute a ringer on the computing device;
determining that the particular location comprises a new location that the first user has not previously visited;
sending the particular location and the first profile to a server;
receiving, from the server, a second profile having a second set of decision rules, the second profile selected based on look-alike modelling and based on similarities between the first profile and the second profile, wherein:
the second profile is associated with a second user;
the second profile is similar to the first profile; and
the second user has visited the particular location;
updating the first profile based on the second profile and the second set of decision rules; and
switching, by the one or more processors, from the first set of settings to a second set of settings based on a particular decision rule of the second set of decision rules that are associated with the particular location.

9. The computing device of claim 8, wherein the particular location is determined by at least one of:
a global positioning system (GPS) sensor;
a communications interface including a wireless-based positioning system; or
a visual positioning system that uses image data from an imaging sensor and map data from a mapping application.

10. The computing device of claim 8, wherein the particular location is determined by:
a barometer that determines a barometric pressure of an area surrounding the computing device to determine the altitude.

11. The computing device of claim 8, the operations further comprising:
determining that a modification has been made to the setting to unmute the ringer by the first user;
sending modification data associated with the modification to the server; and
receiving, from the server, one of:
a new set of decision rules selected by the server based at least in part on the modification data; or
a modified set of decision rules, wherein the server modifies the set of second decision rules based at least in part on the modification data to create the modified set of decision rules.

12. The computing device of claim 11, the operations further comprising:
receiving second sensor data from the plurality of sensors;
determining, based on the second sensor data, a second location of the computing device that is different from the first location;
determining that a second event is currently scheduled;
determining that the ringer is muted;
determining that at least the second sensor data or the second event satisfies a second particular rule of the second set of decision rules; and
modifying the setting to unmute the ringer based on the second particular rule.

13. The computing device of claim 8, the operations further comprising:
receiving third sensor data from the plurality of sensors;
determining, based on the third sensor data, a third location of the computing device that is different from the first location;
determining that a third event is currently scheduled;
determining that the ringer is muted;
determining that the third sensor data and the third event fail to satisfy each rule of the second set of decision rules; and
not modifying the setting of the ringer.

14. One or more non-transitory computer readable media storing instructions executable by one or more processors to perform operations comprising:
receiving sensor data from a plurality of sensors;
determining, by the one or more processors and based on the sensor data, that a computing device is being used at a particular location, the computing device having a first profile associated with a first user, the first profile having a first set of decision rules including when to mute or unmute a ringer on the computing device;
determining that the particular location comprises a new location that the first user has not previously visited;
sending the particular location and the first profile to a server;
receiving, from the server, a second profile having a second set of decision rules, the second profile selected based on look-alike modelling and based on similarities between the first profile and the second profile, wherein:
the second profile is associated with a second user;
the second profile is similar to the first profile; and
the second user has visited the particular location;
updating the first profile based on the second profile and the second set of decision rules; and
switching, by the one or more processors, from the first set of settings to a second set of settings based on a particular decision rule of the second set of decision rules that are associated with the particular location.

15. The one or more non-transitory computer readable media of claim 14, wherein the particular location is determined by at least one of:
- a global positioning system (GPS) sensor;
- a communications interface including a wireless-based positioning system; or
- a visual positioning system that uses image data from an imaging sensor and map data from a mapping application.

16. The one or more non-transitory computer readable media of claim 14, wherein the particular location is determined by:
- a barometer that determines a barometric pressure of an area surrounding the computing device to determine the altitude.

17. The one or more non-transitory computer readable media of claim 14, the operations further comprising:
- determining that a modification has been made to the second set of settings by the first user, the modification performing at least one of:
  - enabling or disabling a vibrate mode;
  - enabling or disabling wireless communications;
  - enabling or disabling cellular communications;
  - enabling or disabling near field communications;
  - enabling or disabling a do not disturb setting;
  - enabling or disabling a battery saver setting;
  - modifying a media volume setting;
  - modifying a call volume setting;
  - modifying a speakerphone or earpiece setting;
  - modifying ringer volume setting;
  - modifying an alarm volume setting;
  - modifying a notification setting;
  - modifying a mobile data setting;
  - modifying a preset reply setting; or
  - modifying a setting identifying a particular ringer and an associated volume associated with a particular sender of a communication; and
- sending modification data associated with the modification to a server.

18. The one or more non-transitory computer readable media of claim 14, the operations further comprising:
- receiving, from the server, one of:
  - a new set of decision rules selected by the server based at least in part on the modification data; or
  - a modified set of decision rules, wherein the server modifies the second set of decision rules based at least in part on the modification data to create the modified set of decision rules.

19. The one or more non-transitory computer readable media of claim 14, the operations further comprising:
- receiving second sensor data from the plurality of sensors;
- determining, based on the second sensor data, a second location of the computing device that is different from the first location;
- determining that a second event is currently scheduled;
- determining that the ringer is muted;
- determining that at least the second sensor data or the second event satisfies a second particular rule of the second set of decision rules; and
- modifying the setting to unmute the ringer based on the second particular rule.

20. The one or more non-transitory computer readable media of claim 14, the operations further comprising:
- receiving third sensor data from the plurality of sensors;
- determining, based on the third sensor data, a third location of the computing device that is different from the first location;
- determining that a third event is currently scheduled;
- determining that the ringer is muted;
- determining that the third sensor data and the third event fail to satisfy each rule of the second set of decision rules; and
- not modifying the setting of the ringer.

* * * * *